UNITED STATES PATENT OFFICE.

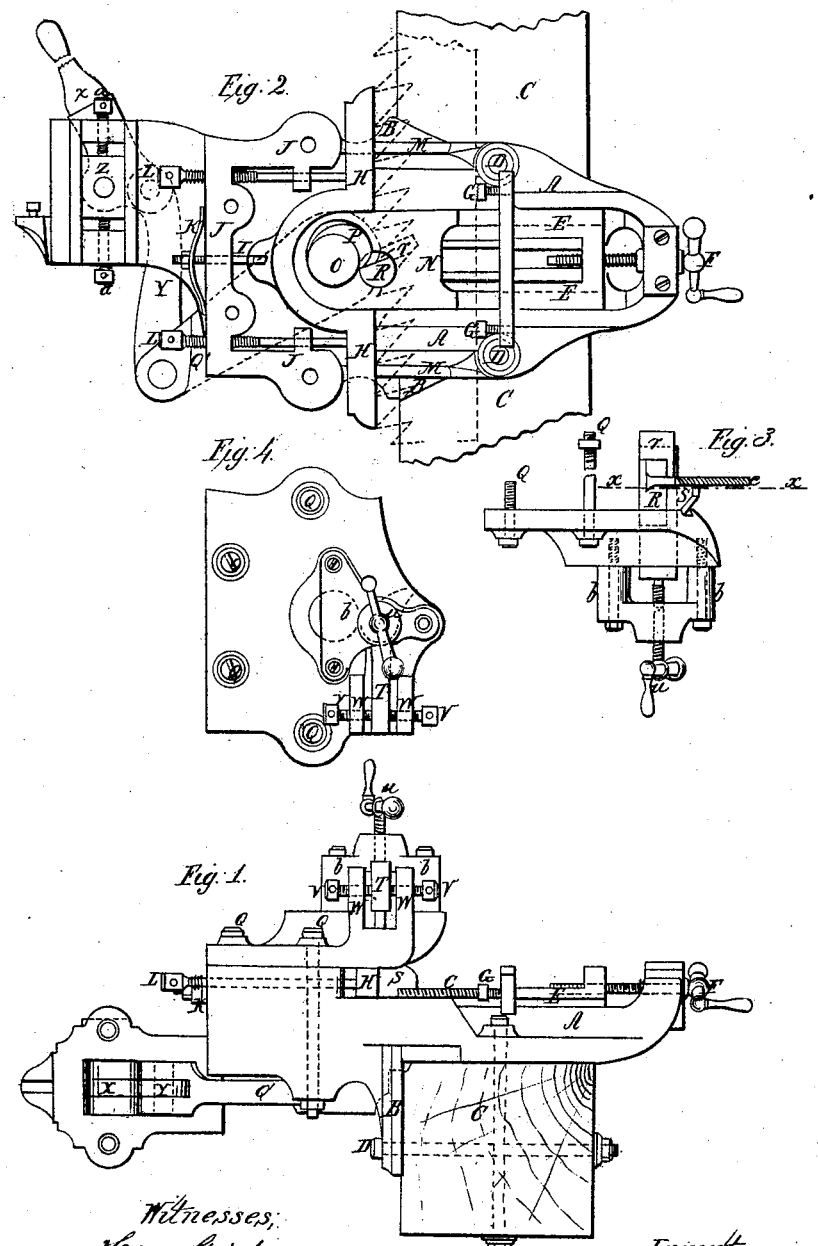

GORDON B. PATTEE, OF OTTAWA, ONTARIO, CANADA.

IMPROVEMENT IN SAW-TOOTH SWAGES.

Specification forming part of Letters Patent No. 110,390, dated December 20, 1870.

*To all whom it may concern:*

Be it known that I, GORDON BURLEIGH PATTEE, of the city of Ottawa, in the county of Carleton, in the Province of Ontario and Dominion of Canada, have invented certain Improvements in Machines for Swaging the Teeth of Saws, of which the following is a specification, reference being had to the annexed drawings, in which—

Figure 1 represents a side elevation of a machine embodying my invention, the saw being shown in position. Fig. 2 is a top view thereof with the cap removed, the anvil-bar being shown in section on the line *x x*, Fig. 3. Fig. 4 shows in an inverted position the opposite side of the cap represented in Fig. 1. Fig. 4 is a top view of the same.

The invention consists in the construction of a machine for swaging the teeth of straight saws by the application of a cam-shaft and cam pressing the tooth of the saw against an adjustable anvil-piece and die-piece, to give the tooth the required form of splay at the point. The cam-shaft is operated by a cam-lever, which is connected by a pitman to an arm on the end of the shaft. The compound motion of the cam-shaft and cam elongates and widens the tooth simultaneously. The adjustment of the saw to the anvil-bar is effected by the operation of a pivoted jaw, regulated by set-screws and by a sliding block, provided with grip-screws, and operated by a hand-screw. The anvil-bar and die-piece are adjustable, by screws, to suit any thickness of saw-plate.

A represents the frame or bed-plate of the machine, on which is cast brackets B, to fasten the machine to a fixed post, C, by bolts D. At one end of the machine, in dovetail grooves, slides a block, E, which is adjustable to suit any width of saw, by the hand-screw F, passing through the end of the machine and through a nut on the block, the grip-screws G, inserted therein, being regulated to a proper projection to adjust the swing of the saw to suit the "hook" or angle of the tooth. H is a jaw, pivoted to a rod, I, which passes through a flange, J, cast on the frame A. It is secured at the outside of the flange by a nut, a spring, K, intervening, to withdraw the jaw when released from the screws L L, by which the jaw is tilted and fixed to suit the hook or shape of the tooth to the anvil-bar. The jaw H rests laterally on flanges M M, raised from the bed-plate A, and on a central portion, N, of equal height. Through this central portion passes one end of a shaft, O, which is provided with a cam, P. The other end of the shaft enters a cap, Fig. 3, which rests against the flange J, and is fastened thereto by screw-bolts Q Q. An anvil-bar, R, passes through the cap, Figs. 3 and 4, and into the central projection, N, of the bed-plate A. This bar is constructed with a shoulder, S, which partly enters a recess in the cap to prevent the bar turning round. The upper part of the bar, immediately under the cam, is slightly concaved, to give the point of the tooth a corresponding curve or indentation. At the concaved portion of the anvil-bar the shoulder S is cut away obliquely to allow the tooth of the saw to be widened laterally at the point. The anvil-bar has at that end, entering the frame A, a flattened part, to receive the flat face of a die-piece, *r*, which, at one end, is notched beveling, to allow the tooth of the saw to be widened laterally, as at the opposite side. This die-piece *r* is made a little longer than the end of the anvil-bar, and is adjusted longitudinally to the thickness of the saw-plate by a screw-plug passing through the back of the bed-plate A.

To that end of the anvil-bar passing through the cap, Figs. 3 and 4, is fitted an arm, T, having a spring interposed between it and the plate of the cap, to withdraw the shoulder S from the saw after the screw U, passing through an elevated table, *b*, is released from the end of the anvil-bar. The end of the arm T is clamped between screws V V, passing through jaws W W, cast with the cap. By means of the screws U and V, the shoulder S and anvil-bar R are adjusted to the saw-plate and tooth to suit any thickness of gage. The arm Q' is keyed to the end of the cam-shaft O at the rear of the bed-plate A, and, when operated by the elevation and depression of a cam-lever, X, and pitman Y, gives a slight rotary motion to the cam-shaft and cam P, which press on the tooth of the saw *c*, placed on the anvil-bar, and between the shoulder S and central portion, N, of the bed-plate A.

Z Z are sliding journal-boxes, adjustable by screws *a a*, to receive the axle of the cam-lever X. By means of these boxes any slight looseness resulting from wear at the joints of the pitman and cam-lever, may be tightened. The rotary motion of the cam-shaft and cam draws out or elongates each tooth at its point simultaneously with the pressure therefrom, widening or splaying it, thus prolonging the wear of the saw by economizing what would otherwise be wasted in filing, thus rendering less filing necessary.

What I claim is—

1. The anvil-bar R, fitted with a movable die-piece, r, and provided with a shoulder, S, for shaping a saw-tooth, as described.

2. The combination of the jaw H, rod I, spring K, screws L L, and plate A, arranged and operating as described, for the purpose set forth.

3. The arrangement of the arm T, table b, set-screws V V, and screw U, for adjusting the anvil-bar and shoulder S, as specified.

4. The combination of the cam-lever X, pitman Y, the sliding journal-boxes Z Z, when applied, as set forth, and arm Q', with the cam-shaft O, as set forth.

G. B. PATTEE.

Witnesses:
HENRY GRIST,
JOHN GRIST, Jr.